(12) United States Patent
Batge et al.

(10) Patent No.: US 11,885,299 B2
(45) Date of Patent: Jan. 30, 2024

(54) METHOD AND TESTING DEVICE FOR TESTING ROTOR BLADES (71) Applicant: Fraunhofer-Gesellschaft Zur Forderung Der Angewandten Forschung E.V., Munich (DE)

(72) Inventors: Moritz Batge, Bremen (DE); Malo Rosemeier, Bremen (DE); Bernd Haller, Rastede (DE); Kwangtae Ha, Bremen (DE); Willi Wroblewski, Lilienthal (DE); Florian Sayer, Bremen (DE)

(73) Assignee: Fraunhofer-Gesellschaft zur Förderung der Angewandten Forschung E.V., Munich (DE)

( * ) Notice: Subject to any disclaimer, the term of this patent is extended or adjusted under 35 U.S.C. 154(b) by 471 days.

(21) Appl. No.: 17/288,623

(22) PCT Filed: Oct. 24, 2019

(86) PCT No.: PCT/EP2019/079073
§ 371 (c)(1),
(2) Date: Apr. 26, 2021

(87) PCT Pub. No.: WO2020/089038
PCT Pub. Date: May 7, 2020

(65) Prior Publication Data
US 2022/0010780 A1 Jan. 13, 2022

(30) Foreign Application Priority Data
Oct. 29, 2018 (DE) ..................... 10 2018 218 515.8

(51) Int. Cl.
*F03D 13/30* (2016.01)
*G01M 5/00* (2006.01)
*F03D 17/00* (2016.01)

(52) U.S. Cl.
CPC ........... *F03D 13/30* (2016.05); *G01M 5/0058* (2013.01)

(58) Field of Classification Search
CPC .... F03D 11/0091; F03D 7/0224; F03D 7/041; F03D 13/30; G01M 5/0066;
(Continued)

(56) References Cited

U.S. PATENT DOCUMENTS

| 2006/0037402 A1 | 2/2006 | Musial | |
| 2011/0041617 A1* | 2/2011 | Cotrell | F03D 17/00 73/660 |
| 2011/0146375 A1* | 6/2011 | Schmaling | G01M 5/0016 29/559 |

FOREIGN PATENT DOCUMENTS

EP 2741068 A1 * 6/2014 .......... G01M 5/0016

OTHER PUBLICATIONS

PCT International Search Report and Written Opinion (PCT/EP2019/079073).
(Continued)

*Primary Examiner* — Brandi N Hopkins
(74) *Attorney, Agent, or Firm* — Marshall & Melhorn, LLC (57) ABSTRACT

A method for testing a rotor blade of a wind turbine may include predefining a setpoint bending moment distribution. At least two active load-introducing means may be provided which each engage on a load frame. A first of the at least two active load-introducing means may be configured for introducing load in a pivot direction of the rotor blade and a second of the at least two active load-introducing means may be configured for introducing load in an impact direction of the rotor blade. Also provided is at least one passive load-introducing means. A cyclic introduction of load is effected by the at least two active load-introducing means, where a load introduction frequency of the first active
(Continued)

load-introducing means and a load introduction frequency of the second active load-introducing means are selected such that the ratio thereof is rational. A testing device for carrying out the method is also provided.

21 Claims, 8 Drawing Sheets

(58) Field of Classification Search
CPC .... G01M 13/027; G01M 5/0058; G01M 7/06; G01M 5/00; B64C 11/20; G01N 3/22
See application file for complete search history.

(56) References Cited

OTHER PUBLICATIONS

Nathan L. Post—"Fatigue Test Design: Scenarios for Biaxial Fatigue Testing of a 60-Meter Wind Turbine Blade", Technical Report NREL/TP-5000-65227 Jul. 31, 2016; https://www.researchgate.net/profile/nathan_post/p.

* cited by examiner

METHOD AND TESTING DEVICE FOR TESTING ROTOR BLADES

FIELD

The invention relates to a method for testing rotor blades and to a testing device for testing rotor blades.

BACKGROUND

The rotor blades of wind turbines are exposed to heavy loads and wear during operation. A major challenge is to ensure the greatest possible safety, even under extreme conditions, for rotor blades that are often over 30 m long and sometimes much longer. Accidents caused by rotor blade fatigue should, where possible, be eliminated entirely.

Fatigue tests are essential to determine the performance of the rotor blades. In these, an attempt is made to simulate the most realistic possible loads for the rotor blade in test rigs, i.e. the loads that would prevail if the rotor blade were installed in the wind turbine and in operation. Due to the dimensions of the rotor blades mentioned above, testing involves considerable technical, time and financial effort.

One way of reproducing realistic loading conditions in test procedures is to test subcomponents of wind turbines, for example sections of rotor blades with dimensions of a few meters. Several such subcomponents are taken from different points on the rotor blade and measured in test rigs. From this, conclusions can be drawn about the performance of the entire rotor blade.

Another possibility, to which the present invention is also attributable, is to create realistic conditions for a complete rotor blade in the test rig. The loads that exist during operation are typically known. This results in bending moment distributions which are to be cyclically introduced into the rotor blades over a certain number of cycles as setpoint bending moment distribution in the test procedures. However, with prior art methods, large deviations from the setpoint bending moment distribution can often be observed, since previous methods do not allow exact adjustment of the bending moment distribution over the complete length of the rotor blade with the desired accuracy. Due to these deviations, individual areas of the rotor blade fatigue faster than intended and must be repaired in order to continue the load in the other areas. Accordingly, such methods according to the prior art are often inefficient in terms of test duration and energy consumption.

SUMMARY

It is an object of the present invention to provide more efficient testing of rotor blades.

The task is solved by a method according to independent claim 1 and by a testing device according to an auxiliary claim. Advantageous embodiments will be apparent from the dependent claims as well as from the description and the figures.

In the method, a setpoint bending moment distribution is specified with which a rotor blade of a wind turbine is to be loaded.

The rotor blade is clamped in a clamping device of a test rig so that a longitudinal axis of the rotor blade extends from a clamping point of the rotor blade.

One or more load frames are attached to the rotor blade. At least two active load-introducing means are provided, each engaging one of the load frames. A first of the at least two active load-introducing means is configured for introducing loads in a pivot direction of the rotor blade and a second of the at least two active load-introducing means is set up for introducing loads in a impact direction of the rotor blade.

Further, at least one passive load-introducing means is provided to engage one of the load frames and act on the rotor blade. The at least one passive load-introducing means can be used to adjust a system natural frequency for a system comprising the rotor blade and the at least one passive load-introducing means. It should be noted that it is also possible for the load frame(s) to have an effect on the system natural frequencies, so that in such cases these are also included in the system and are taken into account accordingly when determining the system natural frequency. This means that usually all those components are considered which are relevant for the vibration behavior of the rotor blade.

The at least one passive load-introducing means is used to change the system natural frequency in the pivot direction and/or the system natural frequency in the impact direction.

In the method, a cyclic introduction of load is then performed by means of the at least two active load-introducing means, wherein a load introduction frequency of the first active load-introducing means and a load introduction frequency of the second active load-introducing means are selected such that the ratio of the two load introduction frequencies is rational.

In the process, the load frames and the at least two active load-introducing means and the at least one passive load-introducing means are arranged at previously determined positions which are selected in such a way that a bending moment distribution introduced by the cyclic load introduction does not fall below the setpoint bending moment distribution and does not exceed it by more than 20%, preferably not by more than 15%, particularly preferably not by more than 10%. In one possible embodiment of the method, the setpoint bending moment is even exceeded by no more than 5%.

This method makes it possible to selectively adjust the test conditions for the rotor blade along its entire length. By changing the system natural frequencies and adjusting the load introduction frequencies to each other according to the above-mentioned ratios, the energy consumption in the test procedure can be reduced and the test duration minimized. Furthermore, by adjusting the load introduction frequencies, a more controllable movement or oscillation of the rotor blade can be achieved, in which the blade tip describes a Lissajous figure. In particular, the cycles completed for each direction can then be monitored and counted particularly well.

The described method allows for the rotor blade to be sufficiently and uniformly loaded over its entire length, so that there is no premature breakage or premature complete fatigue of individual sections, which would then have to be repaired in order to be able to continue the testing of the remaining sections.

As mentioned, a rational relationship between the load introduction frequencies is set. That is, the ratio is given by $n_1:n_2$, where $n_1$ and $n_2$ are natural numbers. It may be provided that $n_1$ and $n_2$ are each not greater than, for example, 5 to avoid overly complex movements of the rotor blade. Alternatively or additionally, $n_1$ and/or $n_2$ may be equal to 1 while maintaining the rational relationship between $n_1$ and $n_2$. In preferred embodiments, the ratio is 1:2, 2:1 or 1:1. In particularly preferred embodiments, the ratio is 1:1. The latter ratio has the advantage that the maximum load in the pivot direction is not super-imposed with a heavy load in the impact direction and vice versa.

In order to set the desired frequency ratio, it may be provided that the load introduction frequencies are controlled and/or regulated. Monitoring of the movement of the rotor blade or the rotor blade tip can take place and an adjustment of the movement introduced by the active load-introducing means can take place so that the closed Lissajous figures are always produced during the test.

As mentioned, in the method, a modification of the system natural frequency for the pivot direction and/or for the impact direction is performed by the at least one passive load-introducing means.

The at least one passive load-introducing means may be arranged such that the system natural frequency in the impact direction matches the load introduction frequency in the impact direction. However, it is also possible to modify the system natural frequency in the impact direction to introduce an additional load so that it does not deviate by more than 10% from the system natural frequency in the impact direction.

Alternatively or additionally, the at least one passive load-introducing means may be arranged such that the system natural frequency in the pivot direction is made to correspond with the load introduction frequency in the pivot direction or such that the system natural frequency in the pivot direction for introducing an additional load does not deviate more than 10% from the system natural frequency in the pivot direction.

Thus, in possible embodiments, the load introduction frequency in the impact direction and/or in the pivot direction is selected to be identical to the system natural frequency in the respective direction, which may provide energetic ad-vantages. In alternative embodiments, the load introduction frequency in the impact direction and/or in the pivot direction as described above may be selected to deviate from the respective system natural frequency in order to selectively apply an additional load. That is, such frequency detuning may cause the respective detuned active load-introducing means to act similarly to a spring or mass attached to the rotor blade. The deviation from the system natural frequency in typical designs of this type amounts to, for example, less than 10% or less than 5%. In some such embodiments, the deviation to achieve an additional load from the system natural frequency may be even less than 2% or 1%.

In preferred embodiments, the system natural frequency does not deviate from the respective load introduction frequency by more than 10%, in particular less than 5%, in either the impact direction or the pivot direction.

In some embodiments, the at least one passive load-introducing means is configured to act only or substantially only in one direction. That is, it can then be used to modify the system natural frequency in the impact direction while the system natural frequency in the pivot direction remains unchanged or nearly unchanged, or vice versa. When more than one passive load-introducing means is provided, typically at least one of the plurality of passive load-introducing means is configured to act only or substantially only in one direction.

For example, the at least one passive load-introducing means may comprise at least one passive load-introducing means for adjusting the system natural frequency in the impact direction and/or at least one passive load-introducing means for adjusting the system natural frequency in the pivot direction.

In the method, the positions of the load frames and the active and passive load-introducing means can be determined in an optimization process.

Different constants or constraints can be given as well as different target values to be reached or optimized. Design variables can then be adjusted to achieve the target values as well as possible.

For example, constants may typically include the frequency ratio between impact and pivot directions. Either it may be specified that the ratio between impact direction and pivot direction should be rational as mentioned above, or an explicit ratio to be achieved, such as 1:1 or 1:2, may be specified, i.e. the Lissajous figure is in the form of an ellipse or figure eight. In the case of an ellipse as a Lissajous figure, the phase angle between the excitation in the impact direction and the excitation in the pivot direction can be, for example, between 0° and 180°, preferably between 45° and 135°, particularly preferably 90°. In particular, the ellipse may be in the form of a circle. If the Lissajous figure takes the form of a figure eight, the phase angle between the excitations can be, for example, 0° or 180°.

Another constant can be, for example, installation areas in which the load frames can be arranged. For example, minimum distances to the clamping point or to the blade tip or between the load frames or to design-critical areas can be specified.

Further constants can be, for example, a maximum possible deflection of the active load-introducing means or a maximum force of the active load-introducing means.

The setpoint bending moment distribution can be specified, on the one hand, as the target value, which must be achieved at least and as accurately as possible. That is, as a specification, it may be specified, for example, that the bending moment introduced by the load introduction in the impact direction and in the pivot direction at each location is not more than the above-mentioned 20% or 15% or 10% or 5% above the setpoint bending moment distribution and is not less than this. The setpoint bending moment distribution can be prioritized over other target values.

In order to adjust the setpoint bending moment distribution, the middle bending moment caused by gravity can be compensated for, as mentioned above, in particular by the passive load-introducing means. In addition, it is also possible to determine and set a setpoint middle bending moment that corresponds to conditions that are typical in the field. That is, a distribution of moment vector paths occurring in the field can be determined. This is achieved, for example, by means of an aeroservoelastic multi-body simulation. This results in a probability cloud within which the moment vector paths occurring in the field lie. The middle bending moment produced by the passive load-introducing means, preferably by the decoupled masses and/or by appropriately preloaded elastic elements, is then adjusted so that a midpoint of the moment vector paths produced by the active load-introducing means lies within the distribution of the moment vector paths occurring in the field.

The moment vector paths generated in the test can then not only be approximated to the position of the moment vector paths occurring in the field, the moment vector paths can also be adapted to a contour of the probability cloud.

For example, the following two procedures, individually or in combination, may be provided for this adjustment:

First, the rotor blade can be pitched clockwise or counterclockwise about its longitudinal axis. Secondly, a phase angle can be set between the load introduction in the pivot direction and the load introduction in the impact direction.

Further target values can be, for example, the energy consumption or the test duration, each of which can be minimized.

Design variables available in the method to achieve the target values as well as possible include, for example:
the number of load frames,
the position of the load frames,
the design and direction of action of each of the one or more passive load-introducing means used,
the load introduction frequencies of the active load-introducing means.

The optimization process then results, for example, in a specific test rig design or a specific test procedure with the frequencies determined in the optimization process and the number of cycles determined in the optimization process. With this method it can be achieved that as few load frames as possible are needed and that the sections of the rotor blade that are under load are as long as possible.

In the process, the longitudinal axis of the rotor blade typically extends substantially horizontally. The pivot direction can be aligned horizontally, for example. The impact direction is then essentially the vertical direction, although there may also be horizontal components due to the elastic behaviour of the rotor blade or due to deflection of the rotor blade.

It should be mentioned that the influence of gravity, which makes a relevant contribution to the applied bending moment, especially in the case of horizontally clamped rotor blades, is usually taken into account in the choice of active and passive load-introducing means. The weight force acting on the blade causes an middle bending moment, whereby in the case of an otherwise unprepared rotor blade, for example, when the blade is deflected downwards to the maximum, too high a load is introduced on one or both sides of the blade, and too low a load is introduced when the blade is deflected in the opposite direction. With the presented method or test rig, the middle bending moment can be modified, e.g. by appropriately designed passive load-introducing means, and the mentioned too high or too low load can be compensated. Load-introducing means set up for this purpose are described in detail later in this application.

The at least two active load-introducing means may be externally anchored. This means they can be anchored to a ground or wall, for example. Alternatively or additionally, one or more of the at least two active load-introducing means may be mass exciters without external anchorage that cause a mass attached to an actuator to vibrate or rotate.

In an advantageous embodiment, the at least one passive load-introducing means or at least one of the at least one passive load-introducing means is externally anchored. It may, for example, take the form of an elastic element anchored to the ground or wall. It can also be designed as a decoupled mass, which for example is mounted on a rocker, which in turn is mounted for example on the ground or on a wall. Passive load-introducing means of this type have the advantage that they can be designed in such a way that they only act in one direction, for example only in the pivot direction or only in the impact direction. Alternatively or additionally, however, fixed masses that resonate with the rotor blade can be provided as passive load-introducing means.

As mentioned, the at least one passive load-introducing means is typically selected from fixed masses, decoupled masses and elastic elements. In possible embodiments of the method, it may be that at least one of the at least one passive load-introducing means is chosen to be a decoupled mass or an elastic element.

In embodiments of the method, the load introduction frequency of the first load-introducing means may be limited to being identical to the load introduction frequency of the second load-introducing means or to being twice the load introduction frequency of the second load-introducing means. This selection allows load and test duration to be optimized for many applications.

A distance of 1 m can be selected as the minimum distance between two adjacent load frames. This prevents the load frames from being too close to each other, which would mean that areas between the load frames cannot be sufficiently loaded. A maximum distance between two adjacent load frames typically depends on the length of the blade to be tested.

For example, in some embodiments, the number of load frames may be limited to a maximum of ten, or to a maximum of six, or to a maximum of three. In one possible design, exactly two load frames are used.

For example, a testing device for testing a rotor blade that can be used to perform the method described herein may include:
a clamping device for clamping the rotor blade at a clamping point of the rotor blade so that the longitudinal axis of the rotor blade extends substantially horizontally from the clamping point,
at least one load frame for attachment to the rotor blade,
at least two active load-introducing means, each of which is attached to one of the load frames,
at least one passive load-introducing means,
each of which is attached to one of the load frames.

In this case, at least one of the at least two active load-introducing means can be set up for introducing loads into the rotor blade in the pivot direction. Further, at least one of the at least two active load-introducing means may be arranged for introducing load to the rotor blade in an impact direction.

The at least one passive load-introducing means may be externally anchored and comprise an elastic element and/or a decoupled mass and be adapted to adjust a system natural frequency in the pivot direction and/or in the impact direction, for a system comprising the rotor blade and the at least one passive load-introducing means.

Due to this design, the system natural frequency can be adjusted particularly flexibly in the impact direction and/or in the pivot direction, so that the target values can be achieved or optimised particularly well. The at least one passive load-introducing means designed in this way makes it possible, in particular, to set the two system natural frequencies separately.

The active load-introducing means can be designed, for example, as a hydraulic or pneumatic or electric actuator. In preferred embodiments, at least one of the active load-introducing means is externally anchored. In particular, all active load-introducing means may also be externally anchored. Alternatively or additionally, mass exciters which are not externally anchored can also be used as active load-introducing means for impact and/or pivot direction.

The elastic element may, for example, take the form of a spring or a torsion spring or a beam or a leaf spring. The elastic element may be anchored externally, for example to the ground or wall.

The elastic element may comprise a fiber composite material including, for example, glass fibers and/or carbon fibers.

It should be stressed that features mentioned here only in relation to the method can also be claimed for the proposed test rig and vice versa.

In the following, the invention is explained in more detail by way of example with reference to figures.

DETAILED DESCRIPTIONS

Figure 1:
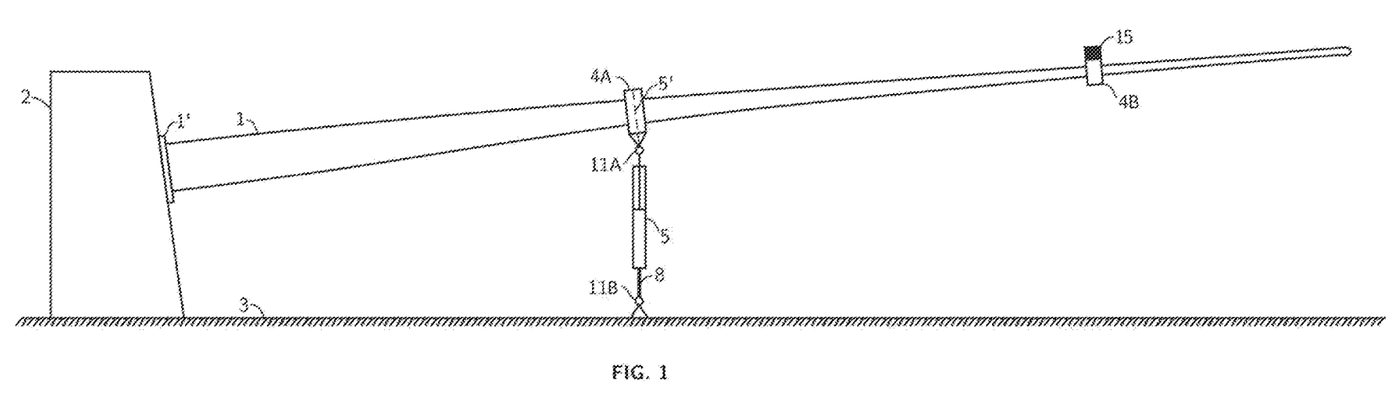
FIG. 1 shows a testing device in an assembly stage, with clamped rotor blade with an active and a passive load-introducing means.

FIG. 1 shows a testing device for testing a rotor blade 1 of a wind turbine. The testing device is in an assembly stage in which several load frames spaced apart from one another in the longitudinal direction and load-introducing means engaging therewith are gradually arranged at previously determined positions on a rotor blade. The testing device comprises a clamping device 2 in which the complete rotor blade 1 is clamped at a clamping point 1' so that its longitudinal axis extends approximately horizontally, while a pivot direction extends horizontally, orthogonally to the drawing plane. Accordingly, an impact direction is approximately vertical.

An active load-introducing means 5 is arranged on the rotor blade, which is designed as a hydraulic, pneumatic or electric actuator. The actuator is connected by means of joints 11A, 11B to a load frame 4A attached to the rotor blade and also to a ground 3 via an additional rod. The actuator acts as an active load-introducing means in the impact direction of the rotor blade, thus substantially vertically, although at least when the rotor blade is vibrated, the actuator can deviate from vertical thanks to the joints 11A, 11B and continue to introduce load into the rotor blade.

A further load frame 4B is arranged further out on the rotor blade 1 and holds a fixed mass 15 as a passive load-introducing means, by which the oscillation behaviour of the rotor blade 1 is influenced. Due to the fixed mass 15, on the one hand, the bending moment acting on the rotor blade is changed and, on the other hand, the natural frequencies of the oscillating rotor blade 1 are modified. That is, a system natural frequency for a system comprising the rotor blade 1 and the passive load-introducing means is modified with respect to the natural frequency of the rotor blade 1 in the pivot direction and in the impact direction due to the passive load-introducing means formed as a fixed mass 15. The actuator may be operated so that its load introduction frequency matches the system natural frequency in the impact direction in which the actuator is acting. However, it can also be operated with a detuning of, for example, less than 1% with respect to the system natural frequency in order to act as a so-called actuator mass or actuator spring and introduce an additional load into the rotor blade.

The structure shown in FIG. 1 represents a possible initial structure for the testing device proposed herein, to which additional elements are added in typical methods according to this application. The position of the load frames 4 and the design and arrangement of the active and passive load-introducing means are selected in such a way that a specified setpoint bending moment distribution is achieved as well as possible.

Figure 2:
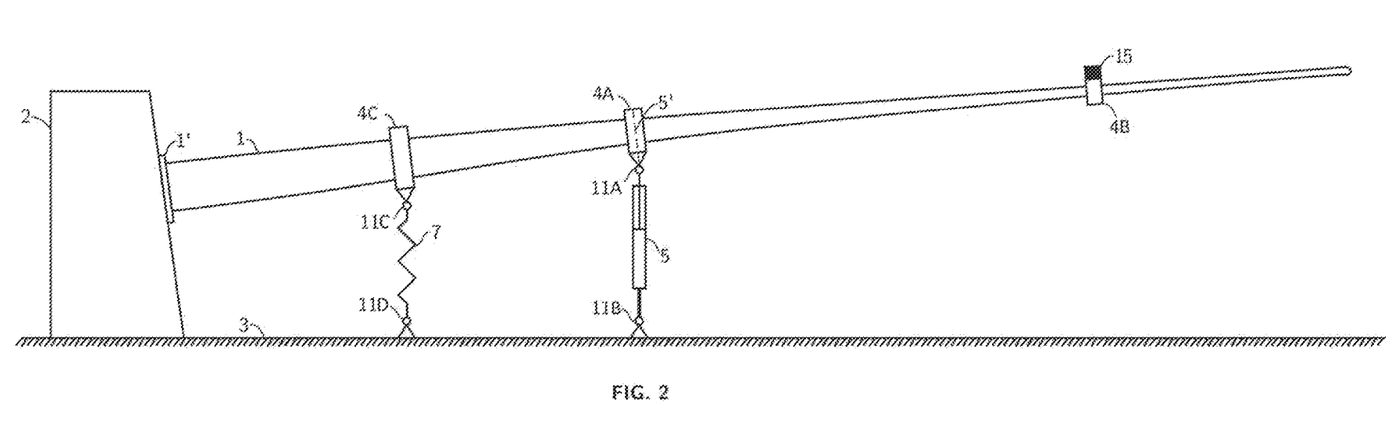
FIG. 2 shows the testing device in an assembly stage, with the rotor blade clamped in place with one active and two passive load-introducing means.

In addition to the elements shown in FIG. 1, FIG. 2 also shows a second passive load-introducing means, which is designed as a spring 7 and also acts in the impact direction. The spring 7 is movably attached to the rotor blade 1 and to the ground 3 by means of joints 11C, 11D. It is located between the active load-introducing means 5 and the clamping point 1' and changes the bending moment distribution in this area. The spring 7 further alters the system natural frequency for the impact direction, but has little or no effect on the system natural frequency for the pivot direction. Only in the case of very large deflections in the pivot direction can a movement in the pivot direction be influenced by the spring 7 shown. Such a spring is therefore suitable for adjusting the system natural frequency for only one selected direction.

It may be, for example, that the design shown in FIG. 2 achieves the desired bending moment distribution in the impact direction with a deviation of, for example, less than 10%, so that the configuration for the impact direction is complete and the configuration for the pivot direction can now be carried out, whereby the design of the active and passive load-introducing means for the direction of pivoting can ensure that the parameters for the impact direction are no longer changed or are changed only insignificantly (see also FIGS. 3 to 18 below). This can be achieved, for example, by making any additional load frames as light as possible. Alternatively, it may be that the influence of the added load frames and the further passive load-introducing means for the pivot direction has already been taken into account in the positioning and selection of the load-introducing means shown in FIG. 2.

Figure 3:
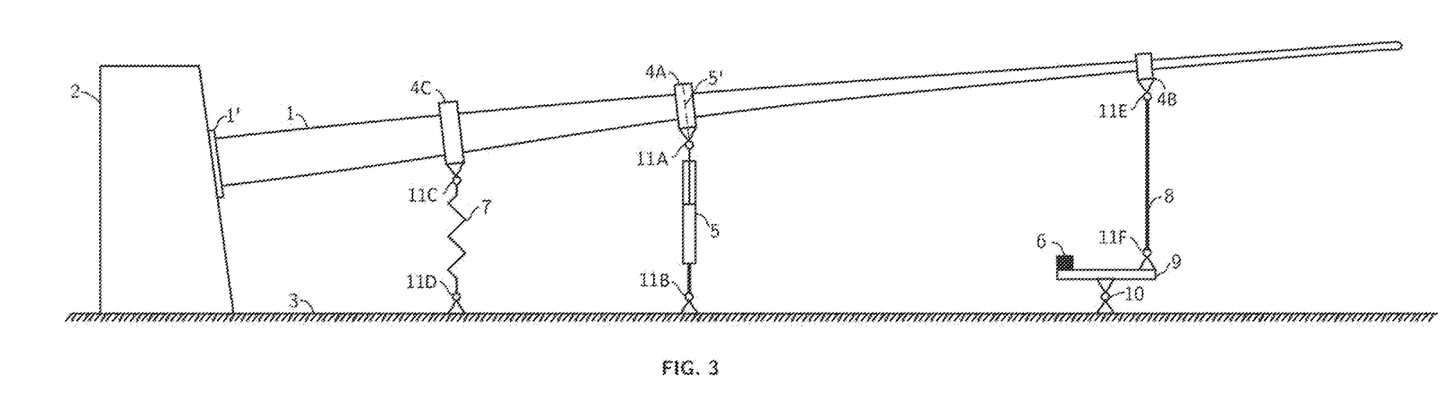
FIG. 3 shows the testing device in an assembly stage, with clamped rotor blade with one active and two passive load-introducing means, each for the impact direction.

FIG. 3 shows a similar structure to FIG. 2, but unlike FIG. 2, a decoupled mass 6 engages the second load frame 4B instead of the fixed mass 15. The decoupled mass 6 is arranged at one end of a lever arm 9, which is mounted on a hinge 10 as a rocker. At an end of the lever arm remote from the decoupled mass 6, the lever arm is connected to the second load frame 4B by means of a rod 8 and by means of joints 11E, 11F. Thus, due to the weight of the decoupled mass 6, a pressure from below is exerted on the rotor blade 1. The decoupled mass 6 again influences the acting bending moment and can be used to adapt the bending moment distribution to the setpoint bending moment distribution. In the configuration shown, it can be achieved that the bending moment is only changed in the impact direction, but not in the pivot direction. The same applies to the modification of the system natural frequencies associated with the attachment of the decoupled mass 6: The system natural frequency essentially changes only in the impact direction and not in the pivot direction.

Figure 4:
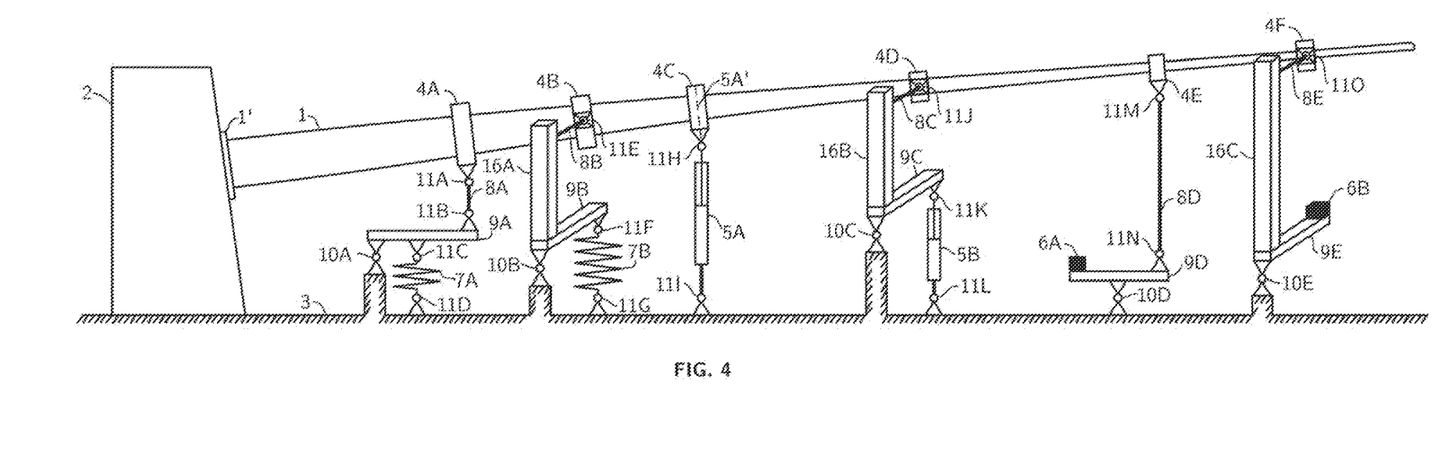
FIG. 4 shows the testing device with clamped rotor blade with active and passive load-introducing means, respectively for the impact direction and the pivot direction.

FIG. 4 shows a testing device in which the rotor blade is clamped as in FIGS. 1 to 3. In this testing device, there are six load frames 4A-4F, to each of which active or passive load-introducing means are coupled. A distance between adjacent load frames is always at least 1 m.

FIG. 4 also shows load-introducing means which are designed to act in the pivot direction but not in the impact direction, as will be explained below. It should be noted that although a separate load frame is shown for each load-introducing means in the figure, multiple load-introducing means may engage a single load frame. In particular, one or more of the load frames may each have a load-introducing means acting in the impact direction and a load-introducing means acting in the pivot direction (see also FIG. 16). However, at least two load frames are typically required at least in order to be able to fasten the minimum number of load-introducing means envisaged in the method and in order to properly achieve the setpoint bending moment distribution.

At a first load frame 4A arranged closest to the clamping point 1', an elastic element configured as a spring 7A is configured as a passive load-introducing means so as to act in the impact direction of the rotor blade 1. The spring acts on the load frame 4A via a lever arm 9A, which pivots about a hinge 10A, and a vertical rod 8A, which is connected to the lever arm, and acts to distribute the bending moment in the impact direction.

A second load frame 4B has a similar device arranged thereon as in the case of the first load frame 4A, in which a spring 7B acts as a passive load-introducing means. The spring 7B acts on one end of a lever arm 9B. At the other end of the lever arm 9B, it sits on a hinge 10B. Above the hinge 10B, an angled beam 16A is also provided extending upwardly at right angles to the lever arm 9B. The angled beam is in turn connected to the load frame 4B by a horizontally extending rod 8B. That is, the passive load of the spring 7B is redirected by the device such that the bending moment distribution in the vicinity of the second load frame 4B is modified in the pivot direction. Designs in which a lever arm movably mounted on a joint is equipped with an angled beam and rod are suitable for deflecting the acting forces into the horizontal, i.e. in the present configuration into the pivot direction of the rotor blade 1. Such a device can also be used in conjunction with other load-introducing means, such as active load-introducing means or decoupled masses, as will be further described below.

An actuator 5A is arranged on a third load frame 4C as an active load-introducing means, which is configured as shown in FIGS. 1 to 3 and accordingly acts in the impact direction.

A further actuator 5B is arranged on a fourth load frame 4D, which acts in the pivot direction. This is achieved, analogously to the case of the load frame 4B, by connecting the further actuator 5B to a lever arm 9C movably mounted on a hinge 10C. The lever arm is connected to the fourth load frame 4D via an upwardly directed angled beam 16B and a horizontal rod 8C, and the force applied by the further actuator 5B is thus redirected in the pivot direction.

Further towards the tip of the rotor blade 1, two more load frames 4E, 4F are arranged, each connected to a decoupled mass 6A, 6B. The decoupled mass acting on the load frame 4E acts in the impact direction, just as in the case of FIG. 3. The decoupled mass 6B connected to the load frame 4F acts in the pivot direction by providing, again analogously to the case of the load frames 4B or 4D, a lever arm on which it is placed with an angled beam 16C and a rod 8E on a side opposite to the mass 6B.

In the present case, the elastic elements are located closest to the clamping point, followed by active load-introducing means and finally the decoupled masses located furthest out. This configuration can be advantageous for producing bending moment distributions typical of rotor blades.

By means of the passive load-introducing means provided, on the one hand the bending moment distributions in the pivot direction and in the impact direction are adapted to the setpoint bending moment distribution in the respective direction in such a way that the bending moment distribution during testing is not more than 10% or not more than 5% above the setpoint bending moment distribution and at the same time does not fall below it. On the other hand, the system natural frequencies for the rotor blade 1 with the load-introducing means arranged thereon are changed.

The direction of action of the rods 8B, 8C, 8E for the passive and active load-introducing means in the pivot direction is selected to coincide with the direction of pivoting movement at the load introduction point in the rest state. The load-introducing means can then act decoupled from the impact moment. Exactly the opposite is true for the rods 8A, 8D of the load-introducing means for the impact direction. Specifically, this may mean that at the various sections where the load frames are located, the pivot and impact modes and their respective directions of movement are determined for the system with the passive load-introducing means located thereon, and the rods are arranged as described based on the determined directions of movement. During the test, the rods are then deflected equally in both directions from their resting state.

Now, when the setup described in FIG. 4 is used to test the rotor blade 1, cyclic loads are introduced into the rotor blade in the horizontal and vertical directions by means of the active load-introducing means 5A, 5B. The load introduction frequency of the load-introducing means 5B acting horizontally or in the impact direction is either identical to the load introduction frequency of the load-introducing means 5A acting in the vertical direction or the impact direction, or the ratio between the two load introduction frequencies is rational, in particular, for example, is 2:1 or 1:2.

The passive load-introducing means adjust the system natural frequencies in the impact direction and in the pivot direction so that they do not deviate by more than 10% from the load introduction frequency in the respective direction.

In particular, it may be that excitation is exactly at the system natural frequencies, i.e. the load introduction frequencies correspond to the system natural frequencies in the respective direction. This allows the test duration and energy consumption to be further reduced.

However, it is also possible that the load introduction frequencies are detuned with respect to the system natural frequencies prevailing in the respective direction, i.e. for example a deviation of at most 10% or at most 5% or at most 2% or at most 1% with respect to the system natural frequency is set. This allows an additional load to be applied to the rotor blade 1.

The actuators 5A, 5B of the active load-introducing means are designed as hydraulic, pneumatic or electric actuators. In the present example, they are externally anchored, whereby the described possible additional load introduction can be advantageously achieved by detuning the excitation frequencies. However, it is also possible to design the active load-introducing means as mass exciters, that is, as actuators fixed to the rotor blade 1 which cyclically move a mass attached thereto.

In the proposed method or associated testing devices, typically at least one of the passive load-introducing means is configured as a decoupled mass or an elastic element and is connected to the ground or wall. Furthermore, it is typical in the method or testing devices that at least one passive load-introducing means is set up for load application in the pivot direction and at least one passive load-introducing means is set up for load introduction in the impact direction.

To illustrate the invention, another example using specific numerical values will be given: For example, it may be that the rotor blade 1 in the unprepared state has a natural frequency in the impact direction of 0.7 Hz and a natural frequency in the pivot direction of 0.9 Hz. Then, for example, an adjustment of the natural frequencies can be made via the attachment of the passive load-introducing means, in which the system natural frequency in the impact direction is raised to 0.9 Hz in order to produce a frequency ratio of $f_{impact}:f_{pivot}=1:1$. However, the system natural frequency can also be raised to 1.4 Hertz in the pivot direction to produce a frequency ratio of $f_{impact}:f_{pivot}=1:2$.

Then the load introduction can be carried out with the corresponding frequency ratio in resonance, i.e. the load introduction frequency can be selected equal to the system natural frequency in each case. The cycles can then be easily observed and counted. In the case of the frequency ratio 1:1, for example, 3 million cycles can be performed for each direction. For example, at the frequency ratio of 1:2, 1 million cycles can be performed in the impact direction and 2 million cycles can be performed in the pivot direction, and the test is preferably completed simultaneously for both directions. A frequency ratio of 2:1 is therefore advantageous, for example, if twice as many cycles are provided in one direction as in the other for applying the desired load.

To adjust and maintain the frequency ratio, the test rig has a control and/or regulating device. This allows the blade to perform movements corresponding to closed Lissajous figures throughout the test period.

FIGS. 5 to 16 illustrate and explain possibilities for active and passive load-introducing means which can be used in testing devices or methods according to the present application and which can be combined with each other by arranging them on the same rotor blade—on the same or on different load frames. These load-introducing means allow the bending moments prevailing during the test to be modified in a targeted manner. In each case, a section through the rotor blade 1, orthogonal to the longitudinal axis of the rotor blade 1, is shown.

Figure 5:
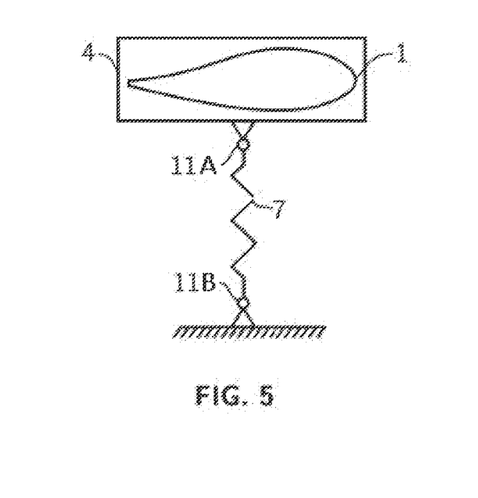
FIGS. 5-11 show passive load-introducing means for the impact direction, each comprising an elastic element.

FIG. 5 shows a passive load-introducing means in which a spring 7 is connected as an elastic element to the ground 3 and a bottom surface of a load frame 4 via joints 11A, 11B so that a spring force acts in the impact direction of the rotor blade 1 by compression or expansion of the spring.

Figure 6:
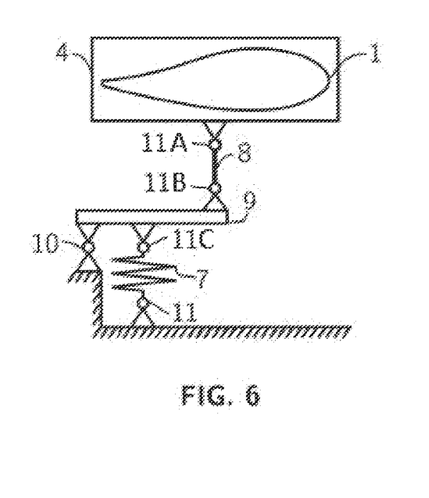

FIG. 6 shows a passive load-introducing means with a spring 7 as an elastic element, which is connected here to the underside of a lever arm 9, which is movably arranged by a hinge 10 and is in turn connected to the underside of the load frame 4 by a rod 8. The arrangement acts in the impact direction.

In the arrangement shown in FIG. 6, thanks to the lever arm 9 arranged between the rotor blade 1 and the ground, the force acting on the rotor blade 1 can be adjusted independently of the distance between the ground and the rotor blade 1. For example, the length of the spring 7, its thickness, and the distance between the hinge 10 and the spring 7 and between the spring 7 and the rod 8 can be varied.

The structure shown in FIG. 6 can also be used analogously for an active load-introducing means by replacing the spring 7 with an actuator.

Figure 7:
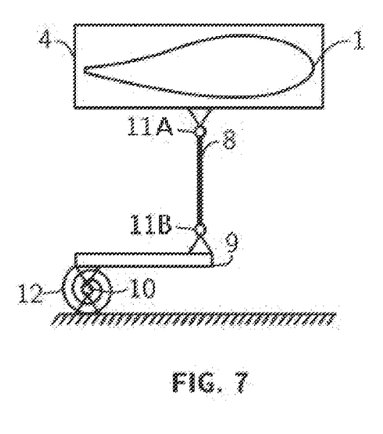

FIG. 7 shows an arrangement for passive load introduction in which a lever arm 9 is fixed on an elastic element designed as a torsion spring 12. The lever arm moves when the torsion spring 12 is deformed, and transmits a force caused by the torsion spring 12 into the load frame 4 from below via a rod 8 so that it acts in the impact direction of the rotor blade 1. The action of the torsion spring 12 on the rotor blade 1 can be adjusted here by the length of the lever arm 9.

Figure 8:
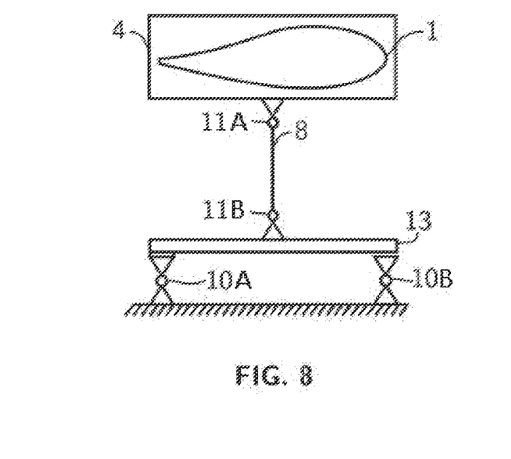

FIG. 8 shows a passive load-introducing means in which an elastic element is provided by supporting a deformable beam 13 horizontally at two opposite ends on hinges 10A, 10B so that it can flex at the centre. At the centre of the beam 13 is a rod 8, which extends vertically upwards and engages the load frame at the bottom to provide a force in the impact direction on the rotor blade 1. The beam 13 is made of a fiber composite material containing glass fibers and/or carbon fibers to be able to withstand the heavy loads during the rotor blade test 1 and to have the required elastic properties. The distance between the two hinges 10A, 10B can modify the spring force acting through the beam.

Figure 9:
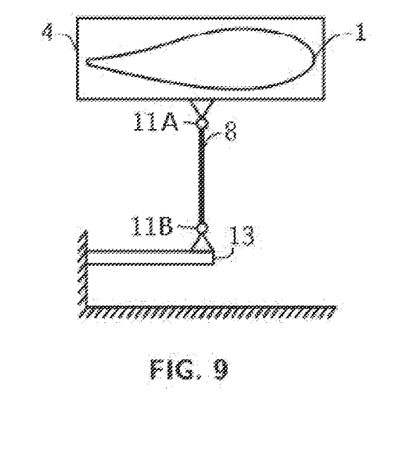

FIG. 9 shows an embodiment of an elastic element formed as a flexible beam 13 fixed on one side only. The beam is attached to a wall or elevation in such a way that it extends horizontally from its attachment and can deflect upward and downward under elastic deformation. At the end facing away from the attachment, the beam 13 is connected to the underside of the load frame 4 via a rod 8, so that the forces resulting from the deformation of the beam 13 act in the impact direction of the rotor blade.

Figure 10:
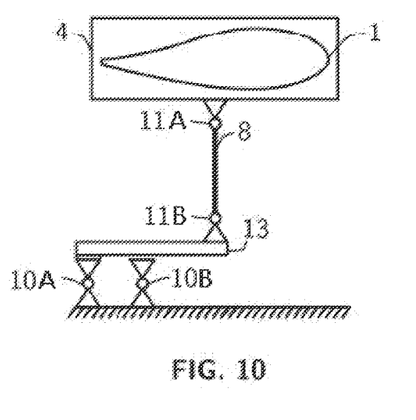

FIG. 10 shows a similar embodiment of a passive load-introducing means to that shown in FIG. 9, in which the beam at the end remote from the rod 8, instead of being attached to a wall or an elevation, is placed on two hinges 10A, 10B arranged side by side to support the beam 13 so that the end with the rod 8 can deform further.

Figure 11:
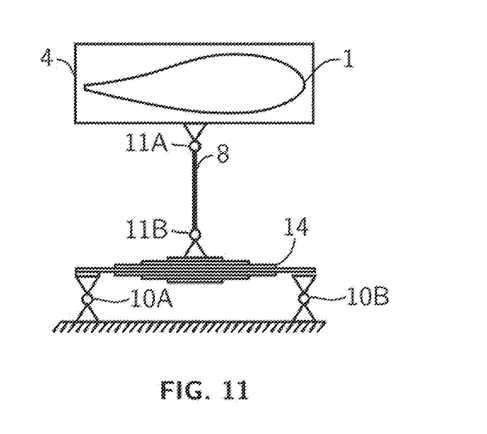

FIG. 11 shows a similar arrangement to FIG. 8, but instead of the beam 13, a leaf spring 14 is supported at opposite ends on two hinges 10A, 10B so that its centre, which is connected to the load frame 4 by a rod 8, can bend. The leaf spring 14 may be made of a fiber composite material comprising glass fibers and/or carbon fibers.

In the embodiments of FIGS. 5 to 11, where elastic elements act in the vertical direction, the elastic elements may be provided with a preload so that a middle bending moment acting on the rotor blade 1 due to gravity is at least partially compensated. This may be necessary, for example, to achieve the predetermined setpoint bending moment distribution according to the invention, in order to avoid an overload in a deflection direction of the rotor blade 1. However, it can also be used to adjust the middle bending moment to a setpoint middle bending moment as desired. This adjustment can also be made in the pivot direction.

Figure 12:
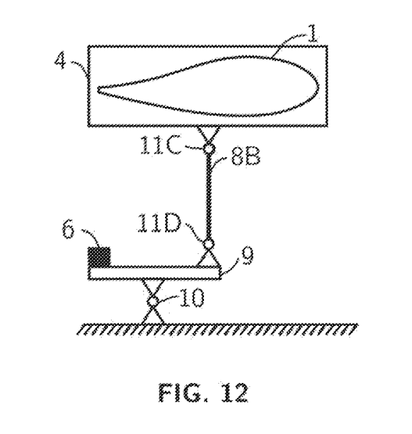
FIG. 12 shows a passive load-introducing means for the impact direction, comprising a decoupled mass.

FIG. 12 shows an embodiment of a passive load-introducing means as an externally anchored decoupled mass. This is the same design as in FIGS. 3 and 4, acting in the impact direction. One advantage is that, unlike a fixed mass which is attached directly to the load frame 4 and vibrates with it, the vibration behaviour can be changed specifically in only one direction. In the configuration shown, the decoupled mass 6 acts both as an oscillating mass for the impact direction and as a counterbalancing force directed against gravity to prevent an overload caused by gravity.

Figure 13:
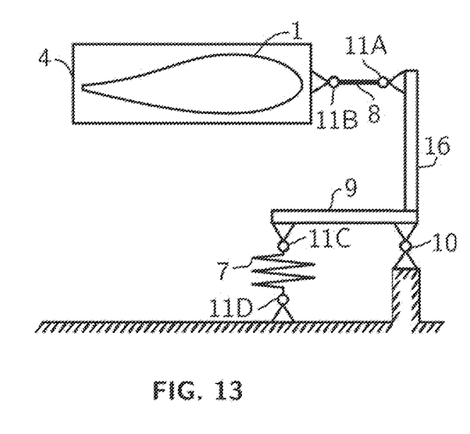
FIG. 13 shows a passive load-introducing means for the pivot direction, comprising an elastic element.

FIG. 13 shows a passive load-introducing means with a spring 7 as an elastic element acting in the pivot direction. For this purpose, the spring is connected to a lever arm 9 mounted on a hinge 10 and initially acts on the lever arm, which moves around the hinge 10. Immediately above the hinge 10 is an angled beam 16 extending upwardly, and in turn thereon is a horizontal rod 8 acting horizontally into the load frame 4. The arrangement with angled beam 16 and rod 8 redirects the force as such that the vertically extending spring acts horizontally. The device can be used to influence the vibration behaviour or the bending moment distribution in the pivot direction, while maintaining the vibration behaviour in the impact direction. The configuration of FIG. 13 can be made without preloading the elastic element, but in embodiments where preloading in the pivot direction is desired, it can also be made with preloading.

Figure 14:
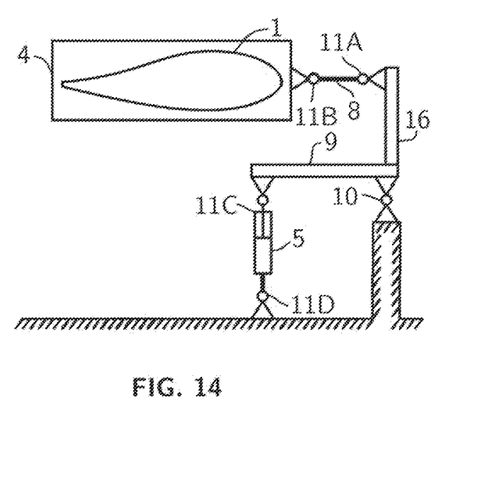
FIG. 14 shows an active load-introducing means for the pivot direction.

FIG. 14 shows an active load-introducing means which acts in the pivot direction of the rotor blade 1, i.e. horizontally. The arrangement for deflecting the direction of action is the arrangement already known, for example, from FIG. 13, with angled beam 16 and horizontal rod 8, whereby an active actuator 5 is used instead of the passive spring 7.

Figure 15:
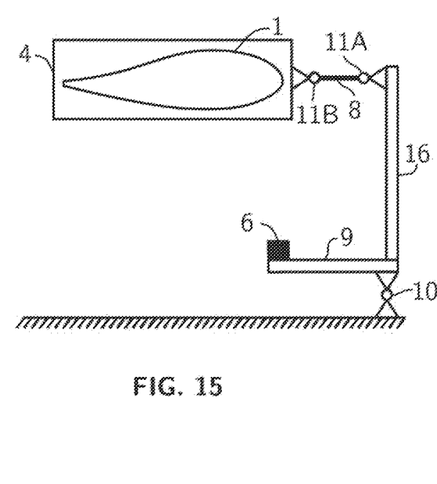
FIG. 15 shows a passive load-introducing means for the pivot direction, comprising a decoupled mass.

FIG. 15 shows a structure for a decoupled mass 6 which is intended to act as an oscillating mass in the pivot direction. The direction of action is again adjusted by means of angled beam 16 and rod 8. The decoupled mass 6 also causes a preload or mean load in the pivot direction.

Figure 16:
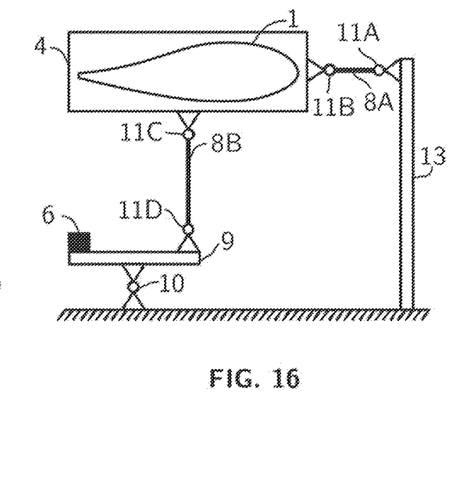
FIG. 16 shows a passive load-introducing means for the pivot direction and a passive load-introducing means for the impact direction, both arranged on a single load frame.

FIG. 16 shows an example of a combination of a horizontally acting load-introducing means and a vertically acting load-introducing means, both acting on the same load frame 4. These are two passive load-introducing means. A decoupled mass 6 acts in the impact direction and an elastic element acts in the pivot direction. The elastic element for the pivot direction is formed as a vertically extending beam 13, which is fixed to the ground 3 and acts on the load frame 4 via a horizontal rod 8A.

The embodiment illustrates how a load-introducing means can be provided for each of the two directions on a single load frame. Other types of load-introducing means can also be combined with each other. For example, any of the load introducing means of FIGS. 5 to 12 may be combined with any of the load-introducing means of FIGS. 13 to 15 to achieve a bending moment distribution that deviates, for example, by no more than 10% from the setpoint bending moment distribution.

In the example shown, the decoupled mass 6 causes a preload in the impact direction, whereas the beam 13 does not cause a preload in the pivot direction.

Figure 17:
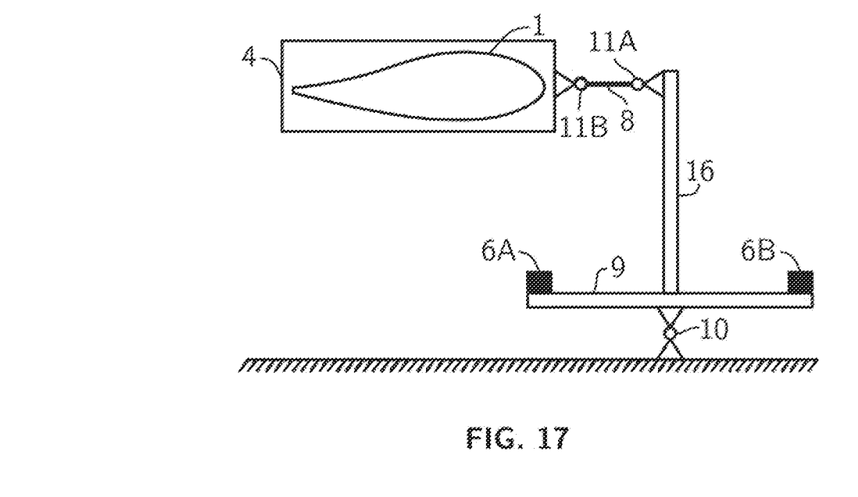
FIG. 17 shows passive load-introducing means for the pivot direction, comprising two decoupled masses.

FIG. 17 shows a passive load-introducing means for the pivot direction comprising two equally sized decoupled masses 6A, 6B seated at opposite ends of a lever arm centrally mounted on a hinge 10. A vertical angled beam 16 is provided directly above the hinge 10, and this is connected to the load frame 4 by a horizontal rod 8. Due to the decoupled masses arranged in this way, the load-introducing means acts as a vibrating mass exclusively in the pivot direction, whereby due to the compensating positioning of the decoupled masses 6A, 6B, a preload or mean load in the pivot direction is avoided. By moving one or both masses 6A, 6B or by using masses 6A, 6B of different sizes, the effective oscillating mass as well as the preload or mean load can be adjusted.

Figure 18:
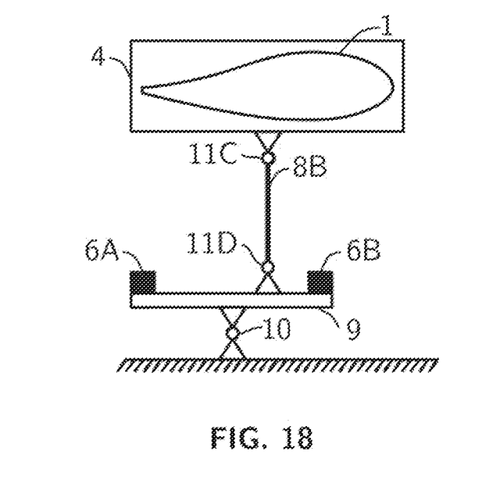
FIG. 18 shows an asymmetrically acting passive load-introducing means for the impact direction, comprising two decoupled masses.

FIG. 18 An asymmetrically acting passive load-introducing means for the impact direction. It comprises two decoupled masses arranged at opposite ends of a beam 9, which sits centrally on a joint 10, as in FIG. 17. A rod 8B is connected to the underside of the rotor blade 1. The rod 8B is displaced relative to the joint 10 to move up and down as the rod moves, corresponding to a vibratory mass load on the rotor blade 1 in the impact direction. The size of the masses 6A, 6B, their position on the beam 9 and the position of the rod 8B on the beam 9 can be used to adjust the oscillating mass load acting in the impact direction and the mean load.

Figure 19:
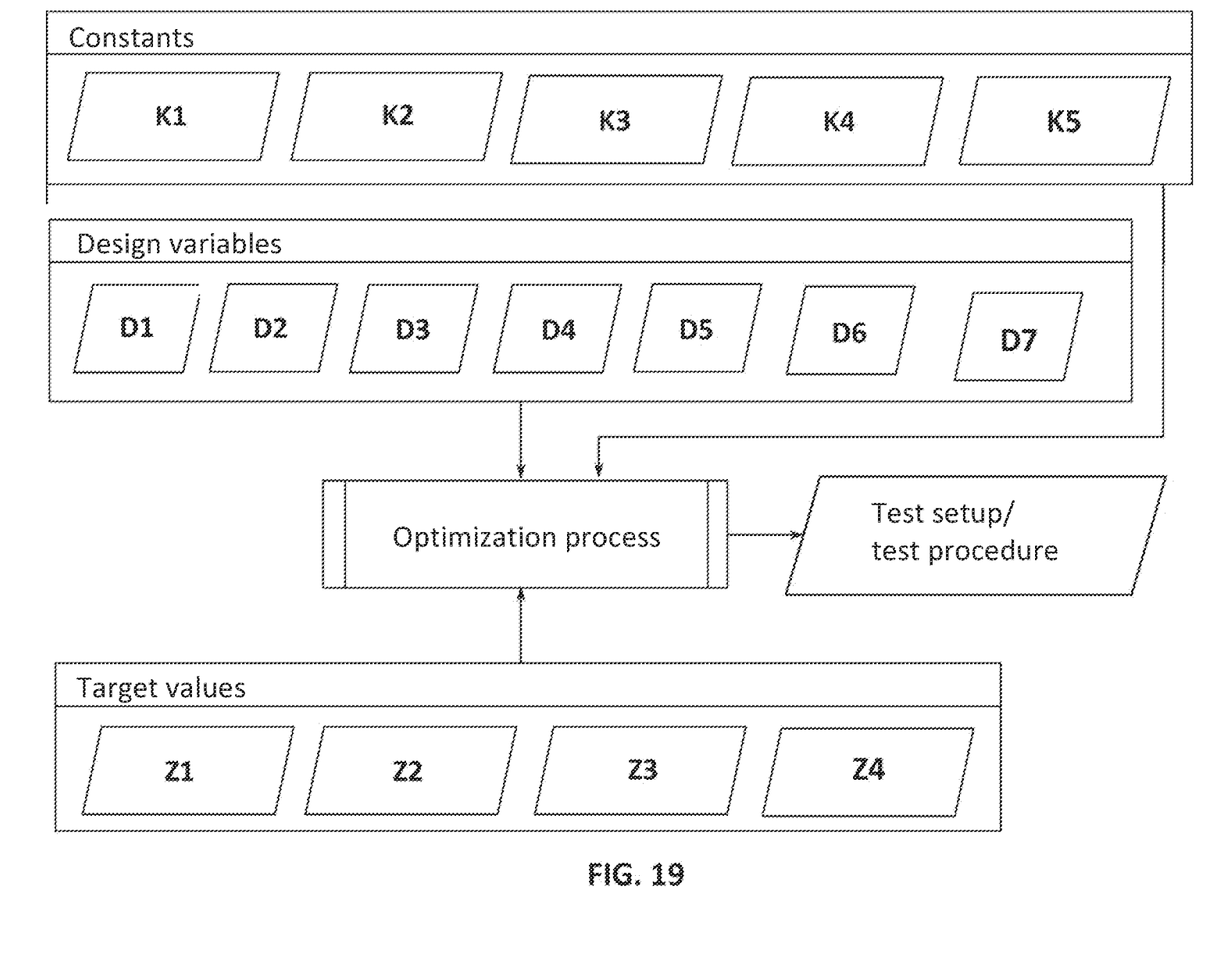
FIG. 19 shows a flow diagram for an optimization process for a method of testing a rotor blade.

FIG. 19 illustrates an optimization process that can be used to achieve a test setup and determine parameters for subsequent testing.

In the optimization process, constants or constraints K1-K5, which are given and cannot be changed, as well as certain target values Z1-Z4, which are to be achieved as well as possible by means of the optimization, are used as input values. In a high-dimensional optimization procedure, design variables D1-D7 are then adjusted to arrive at a setup and experimental design that achieves the target values as well as possible.

The constants or constraints K1-K4 include:
K1: the frequency ratio between the load applied in the impact direction and the load applied in the pivot direction. It is limited to $f_{impact}:f_{pivot}=n1:n2$, where n1 and n2 are integers. Preferably, $f_{impact}:f_{pivot}=1:2$ or $fStroke:f_{pivot}=1:1$.
K2: permissible installation area of the load frames. For each rotor blade 1, there is typically a minimum distance from the clamping point 1' and a minimum distance from the blade tip. Design-critical areas can also be defined in between, in which no load frame may be located. In addition, a minimum distance between two adjacent load frames is usually specified.
K3: maximum actuator deflection. Due to the design of the actuator used, but also due to the dimensions of a hall in which the testing device is placed, the maximum deflection that cannot be exceeded is predetermined.
K4: maximum actuator force. The force of the actuator is limited by its design as well as by load limits of the rotor blade.
K5: Phase angle between the load introduction in the impact direction and the pivot direction. The phase angle can be adjusted to modify a superposition of the load in the impact direction and the pivot direction. It may be envisaged that the phase angle, for example in the case of $f_{impact}:f_{pivot}=1:1$ is chosen as 90°, so that when the maximum load is applied in one of the directions, no load is applied in the other. With $f_{impact}:f_{pivot}=1:2$, for example, 0° or 180° can be selected as the phase angle.

Quantities that are to be achieved as accurately as possible by means of optimization are the target values Z1-Z3:
Z1: Bending moment distribution. First and foremost, it should be achieved that the bending moments introduced in the process correspond as closely as possible to the setpoint bending moment distribution. Falling below the setpoint bending moment distribution is completely avoided. Furthermore, for example, a local exceeding of the nominal bending moment of maximum 10% can be aimed at. Target value Z1 can be prioritized over other target values.

Z2: Energy consumption. Energy consumption should typically be kept as low as possible. Energy consumption can be optimized by aligning the load introduction frequencies and the system natural frequencies.

Z3: Test duration. The test duration should also be kept as short as possible, which can sometimes be achieved by aligning the load introduction frequencies and the system natural frequencies.

Z4: setpoint middle bending moment. If the field conditions of the rotor blade are known from a measurement or a simulation, a setpoint middle bending moment adapted to this can be set (see also FIG. 20).

To achieve the target values Z1-Z3, the design variables D1-D6 are available as adjusting screws of the optimization, which can be varied:

D1: load frame position. The position of the load frames can be changed in the frame defined by the constant K2, so that additional load frames can be arranged in areas of large deviations from the setpoint bending moment distribution, over which loads are then introduced by means of the load-introducing means (see D3-D5).

D2: number of load frames. The number of load frames can be changed, again taking into account the constant K2. Typically, care is taken to keep the number of load frames as small as possible, since in the immediate vicinity of a load frame, the rotor blade 1 is not loaded or not loaded strongly enough. For example, 2 or 3 load frames may be desired.

D3: Elastic elements. Elastic elements, as described in the figures above, represent a possible passive load-introducing means with which the bending moment distribution can be influenced and the system natural frequency can be changed. They can be used in such a way that the parameters are only changed in the impact direction or in the pivot direction. They can be attached to one or more of the load frames. They can be designed with or without preload or mean load.

D4: fixed masses. Fixed masses can also be used to adjust bending moments and system natural frequencies. They cause a change in bending moments and system natural frequencies in both directions and are typically used when an adjustment is needed that requires it. The fixed masses can be attached to one or more of the load frames.

D5: Decoupled masses. Like elastic elements, decoupled masses can be used specifically for an adjustment in the impact direction or in the pivot direction. The decoupled elements can have a reversed direction of action compared to the elastic elements and can accordingly be used for opposite corrections. The decoupled masses can be attached to one or more of the load frames. They can be designed with or without preload or mean load.

D6: Frequency offset of the load introduction frequencies. As mentioned, the load introduction frequencies can be detuned relative to the system natural frequencies to better achieve the setpoint bending moment distribution. This can be at the expense of energy consumption.

D7: Angle of attack of the rotor blade. The angle of attack (also called pitch angle), can be modified to adjust the load introduction (see also FIGS. 20 and 21).

The optimisation process then results in a concrete arrangement of load frames and of active and passive load-introducing means arranged thereon, for example the structure shown in FIG. 4. Likewise, the load introduction frequencies are determined with which excitation is to take place in the test procedure. It may also be that the number of cycles is also determined in the optimization process.

At this point, an example is given for illustrative purposes.

For an exemplary rotor blade, a natural frequency in the impact direction can be 0.5 Hz and a natural frequency in the pivot direction can be 1 Hz in an unprepared state. In this example, in order to achieve the target load, at least 1 million cycles are required in the impact direction and 3 million cycles in the pivot direction. This would result in a test duration of 23.1 days for the impact direction and 34.7 days for the impact direction according to conventional methods, which would correspond to a total test duration of 57.8 days. According to the method presented here, the natural frequencies can be converted into system natural frequencies. These can have a rational ratio of 1:1, approximately both 0.75 Hz. The amplitude of the load introduction in the impact direction can be changed in such a way that the desired damage is also achieved in this direction after 3 million cycles. The test is then carried out in both directions simultaneously, is completed for both directions at the same time and takes a total of 46.3 days. This reduces the test duration by 20% compared to the conventional procedure.

Figure 20:
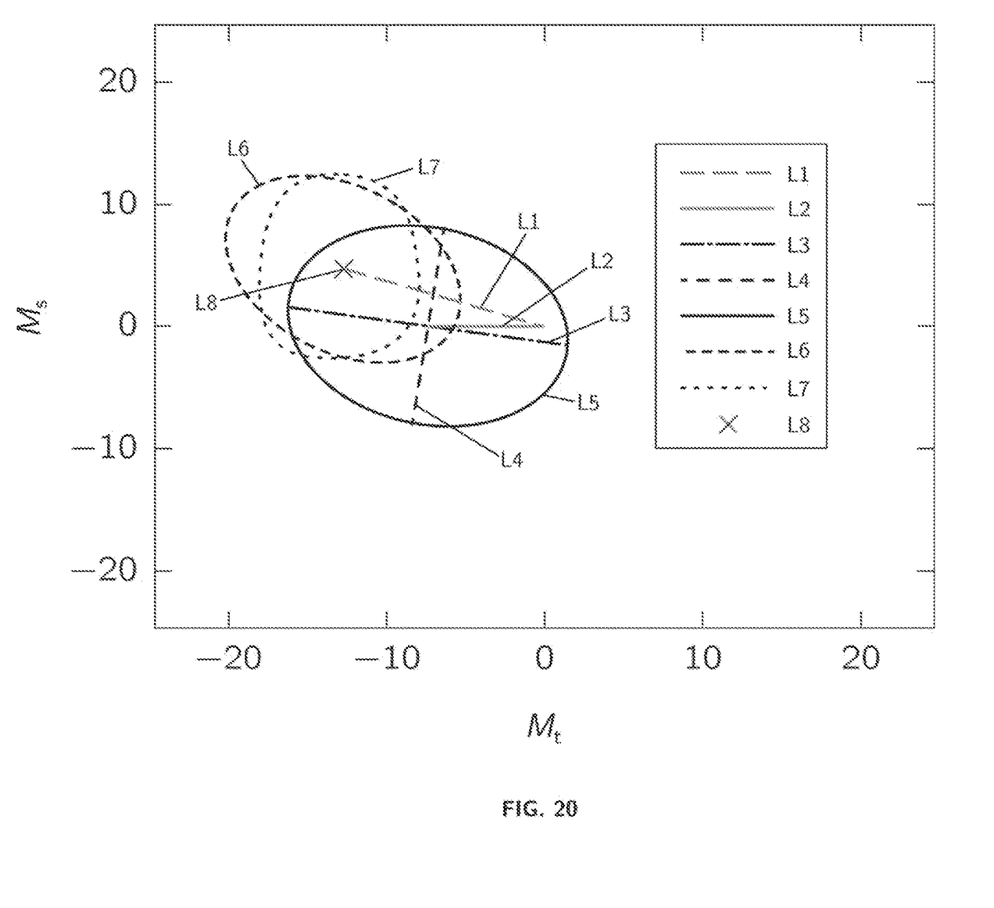
FIG. 20 shows bending moment vectors for a cross-section of the rotor blade.

FIG. 20 shows the bending moment vector components for a cross-section of a rotor blade in the impact direction $M_t$ and in the pivot direction $M_s$. $M_s$ acts about an s-axis and $M_t$ acts about a t-axis (see also FIG. 21 for the definition of the axes in relation to the rotor blade). An ellipse L5 corresponds to the superposition of a uni-axial pivot test L4 and an impact test L3 in a bi-axial test at a frequency ratio of 1:1 and a phase angle of 90°. Gravity causes a middle bending moment in the impact direction, which is marked with L2 and runs as a horizontal line in the diagram. The ellipse is shifted accordingly along L2 by the influence of gravity.

FIG. 20 further shows the outline of a probability cloud L7. This probability cloud L7 shows moment vector paths typically occurring in the field. Such probability clouds are determined with the aid of aeroservoelastic multi-body simulations, typically for different loading scenarios occurring in the field. Thus, the probability cloud L7 gives a range in which the moment vector paths run under realistic conditions.

By means of static middle bending moments in the impact direction and pivot direction (vector L1), which are introduced with the decoupled masses or pre-stressed spring elements described in this document, the centre of the ellipse L5 achieved in the test procedure described here, which was displaced along L2 under the influence of gravity, can now be further displaced along the vector L1 towards a point L8, which represents a centre of the probability cloud L7. This corresponds to the setting of the setpoint middle bending moment. Alternatively or additionally, by pitching the rotor blade, the effective direction of the gravitational vector L2 relative to the ellipse L5 can be influenced so that it coincides with the effective direction of L1. A phase angle adjustment of greater/smaller 90° allows the ellipse to be rotated counterclockwise/clockwise. If the pivot amplitude and impact amplitudes are further scaled, it is possible to transform the ellipse L5 into the ellipse L6 and thus to approximate the moment cloud L7 occurring in the field.

The advantage of this method is a more realistic (closer to the most frequently occurring field conditions) loading of the rotor blade. Furthermore, the shift of the center of the ellipse changes an occurring stress ratio R, which can lead to a reduction of the test cycles if the setpoint bending moment distribution is adjusted due to the changed setpoint middle bending moment, so that a uni-form target damage of the load bearing areas occurs along the areas of the blade to be tested (see for example the publication Rosemeier et al. "Benefits of subcomponent over full-scale blade testing elaborated on a trailing-edge bond line design validation", Wind Energ. Sci., 3, 163-172, 2018, https://doi.org/10.5194/wes-3-163-2018).

Figure 21:
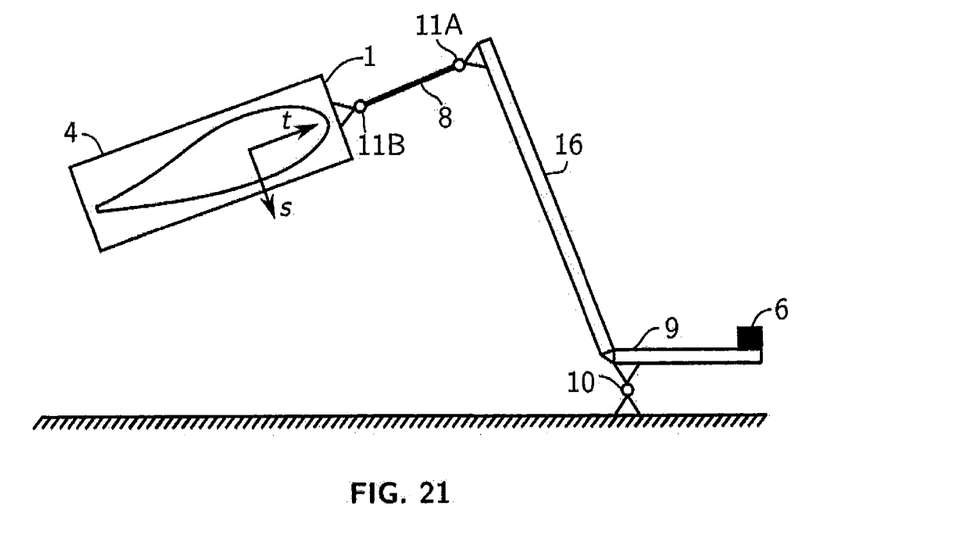
FIG. 21 shows a passive load-introducing means for the pivot direction of a pitched blade, comprising a decoupled mass.

FIG. 21 shows a structure for a decoupled mass 6, which is to act as an oscillating mass in the pivot direction of a pitched rotor blade. The direction of action is adjusted by means of angled beam 16 and rod 8. The rod 8 is mounted at a right angle to the angled beam 16. The lever arm 9 is mounted parallel to ground, so effective direction of gravity acceleration of mass 6 is also oriented perpendicular to ground. The decoupled mass 6 thus causes a preload or mean load in the pivot direction. The figure shows the deflected state.

FIG. 21 shows the coordinate system around whose axes the vectors shown in FIG. 20 act. The rotor blade shown in the figure is pitched in order to adjust the influence of the middle bending moment caused by gravity in the pivoting and impact direction. In this case, the rod 8 is arranged at an angle so that its effective direction in the rest state shown is in a direction of movement of a normal mode of the system in the pivot direction.

Figure 22:
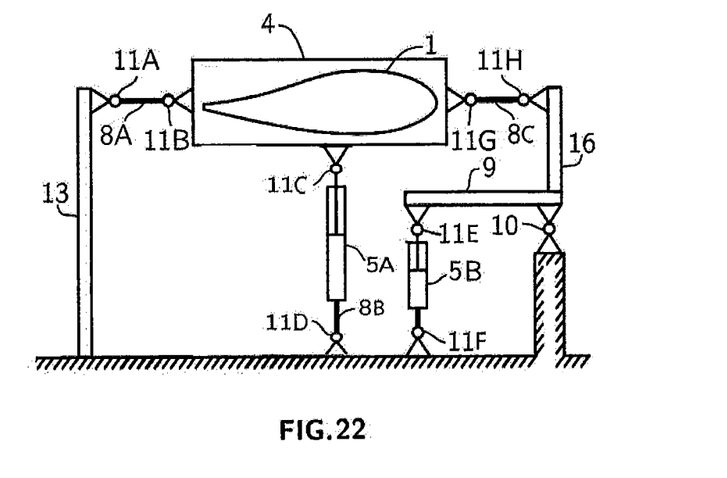
FIG. 22 shows an embodiment of the testing device carrying out a method of testing a rotor blade.

FIG. 22 shows an embodiment of the testing device which is set up for carrying out the method described, a load frame 4 being provided and two active load-introducing means which each act on the load frame 4, a first active load-introducing means 5B being set up for introducing loads in a pivot direction of the rotor blade 1, and a second active load-introducing means 5A being set up for introducing loads in the impact direction of the rotor blade 1. Furthermore, a passive load-introducing means 13, which also engages the load frame 4, is provided. The passive load-introducing means 13 is designed as an elastic beam and acts in the pivot direction. Alternatively or additionally, in possible embodiments of the test rig, a passive load-introducing means for the impact direction may engage the same load frame 4. In carrying out the method according to the application, a system natural frequency for the pivot direction and/or for the impact direction can be changed by the one passive load-introducing means 13. A cyclic introduction of load is effected by means of the two active load applying means 5A, 5B, wherein a load introduction frequency of the first active load-introducing means 5B and a load introduction frequency of the second active load-introducing means 5A are selected so that their ratio is rational. In this case, no further load frames are required in a possible design of the test rig or process.

LIST OF REFERENCE NUMERALS 1 rotor blade
1' clamping point of the rotor blade
2 clamping device
3 ground
4 load frame
5 actuator
5' actuator point of attack
6 decoupled mass
7 spring
8 rod
9 lever arm
10 hinge
11 joint
12 torsion spring
13 elastic beam
14 leaf spring
15 fixed mass
16 angled beam If several elements of a category are present in a figure, these are additionally marked with a letter to distinguish them.

Constants:
K1 frequency ratio impact direction/pivot direction
K2 permissible installation area of the load frames
K3 maximum actuator deflection
K4 maximum actuator force
K5 phase angle between load introduction impact direction/pivot direction Design Variables:
D1 load frame position
D2 number of load frames
D3 elastic elements
D4 fixed masses
D5 decoupled masses
D6 frequency offset of the load introduction frequencies to the system natural frequencies
D7 angle of attack (pitch angle) of the rotor blade Target Values:
Z1 setpoint bending moment distribution
Z2 minimum energy consumption
Z3 minimum test duration
Z4 setpoint middle bending moment (center point)

What is claimed is:

1. A method for testing a rotor blade of a wind turbine, wherein a setpoint bending moment distribution is predetermined, comprising at least the steps:
   clamping the rotor blade in a clamping device so that a longitudinal axis of the rotor blade extends from a clamping point of the rotor blade,
   attaching one or more load frames to the rotor blade,
   providing at least two active load-introducing means which each engage on one of the load frames, wherein a first of the at least two active load-introducing means is set up for introducing load in a pivot direction of the rotor blade and a second of the at least two active load-introducing means is set up for introducing load in an impact direction of the rotor blade,
   providing at least one passive load-introducing means engaging one of said load frames, wherein for a system comprising said rotor blade and said at least one passive load-introducing means, a system natural frequency for the pivot direction and/or for the impact direction is changed by said at least one passive load-introducing means,
   a cyclic introduction of load is effected by the at least two active load-introducing means, wherein a load introduction frequency of the first active load-introducing means and a load introduction frequency of the second active load-introducing means are selected such that the ratio thereof is rational, and wherein
   the load frames and the at least two active load-introducing means and the at least one passive load-introducing means are arranged at previously determined positions which are selected in such a way that a bending moment distribution introduced during cyclic load introduction does not fall below the setpoint bending moment distribution and does not exceed it by more than 20%.

2. The method according to claim 1, wherein the at least one passive load-introducing means is arranged such that the system natural frequency in the impact direction matches the load introduction frequency in the impact direction or, for applying an additional load, deviates no more than 10%, from the system natural frequency in the impact direction.

3. The method according to claim 1, wherein the at least one passive load-introducing means is arranged such that the system natural frequency in the pivot direction coincides with the load introduction frequency in the pivot direction or, for introducing an additional load, deviates no more than 10%, from the system natural frequency in the pivot direction.

4. The method according to claim 1, wherein the at least two active load-introducing means are controlled or regulated for adjusting and maintaining the ratio between the load introduction frequency of the first active load applying means and the load-introduction frequency of the second active load-introducing means.

5. The method according to claim 1, wherein at least one passive load-introducing means is provided for adjusting the system natural frequency in the impact direction and at least one passive load-introducing means is provided for adjusting the system natural frequency in the pivot direction.

6. The method according to claim 1, wherein the rotor blade is clamped such that the longitudinal axis of the rotor blade extends substantially horizontally and the pivot direction is oriented horizontally.

7. The method according to claim 1, wherein the at least two active load-introducing means and/or the at least one passive load-introducing means are externally anchored.

8. The method according to claim 1, wherein the at least one passive load-introducing means is selected from fixed masses, decoupled masses and elastic elements.

9. The method according to claim 1, wherein at least one of the at least one passive load-introducing means is chosen as a decoupled mass or as an elastic element.

10. The method according to claim 1, wherein the ratio between the load introduction frequency of the first load-introducing means and the load introduction frequency of the second load-introducing means is 1:1, 2:1 or 1:2.

11. The method according to claim 1, wherein a distribution of moment vector paths occurring in the field is determined, via an aeroservoelastic multi-body simulation, and a setpoint middle bending moment is set by the passive load-introducing means by the decoupled masses and/or by a bias of the elastic elements, such that a midpoint of moment vector paths generated by means of the active load-introducing means lies within the distribution of moment vector paths occurring in the field.

12. The method according to claim 11, wherein the moment vector paths generated by the active load-introducing means are adapted to a contour of the distribution of the moment vector paths occurring in the field by adjusting the rotor blade clockwise or counterclockwise about its longitudinal axis.

13. The method according to claim 12, wherein the moment vector paths generated by the active load-introducing means are matched to a contour of the distribution of the moment vector paths occurring in the field by adjusting a phase angle between the load introduction in the pivot direction and the load introduction in the impact direction.

14. The method according to claim 1, wherein the ratio between the load introduction frequencies is 1:1 and a phase angle between the load introduction in the pivot direction and the load introduction in the impact direction is between 00 and 180.

15. The method according to claim 1, wherein the ratio between the load introduction frequencies is 1:2 or 2:1 and a phase angle between the load introduction in the pivot direction and the load introduction in the impact direction is 00 or 1800.

16. The method according to claim 1, wherein a minimum distance between adjacent load frames is 1 m.

17. A testing device for testing a rotor blade, comprising:
a clamping device for clamping a rotor blade at a clamping point of the rotor blade, so that a longitudinal axis of the rotor blade extends substantially horizontally starting from the clamping point,
one or more load frames to be attached to the rotor blade,
at least two active load-introducing means, each of which is attached to one of the load frames,
at least one passive load-introducing means attached to one of the load frames,
wherein
at least one of the at least two active load-introducing means is configured for introducing loads into the rotor blade in a pivot direction, and at least one of the at least two active load-introducing means is configured for introducing loads into the rotor blade in an impact direction,
and wherein the at least one passive load-introducing means is externally anchored and comprises an elastic element and/or a decoupled mass and is adapted to adjust a system natural frequency in the pivot direction and/or in the impact direction, for a system comprising the rotor blade and the at least one passive load-introducing means.

18. The testing device of claim 17, further comprising a control device adapted to control a load introduction frequency of the first active load-introducing means and a load introduction frequency of the second active load-introducing means such that a ratio between these two load introduction frequencies is rational.

19. The testing device according to claim 17, wherein the active load-introducing means is in the form of a hydraulic, or pneumatic or electric actuator and is externally anchored.

20. The testing device according to claim 17, wherein the elastic element is designed as a spring or torsion spring or beam or leaf spring and is externally anchored.

21. The testing device, according to claim 7, wherein the elastic element comprises a fibre composite comprising glass fibres and/or carbon fibres.

* * * * *